(12) United States Patent
Ergas et al.

(10) Patent No.: US 8,798,967 B2
(45) Date of Patent: Aug. 5, 2014

(54) SYSTEM AND METHOD FOR COMPUTATIONS UTILIZING OPTIMIZED EARTH MODEL REPRESENTATIONS

(75) Inventors: Raymond Ergas, San Clemente, CA (US); Tamas Nemeth, San Ramon, CA (US); Oliver Pell, London (GB)

(73) Assignee: Chevron U.S.A. Inc., San Ramon, CA (US)

( * ) Notice: Subject to any disclaimer, the term of this patent is extended or adjusted under 35 U.S.C. 154(b) by 648 days.

(21) Appl. No.: 13/075,329

(22) Filed: Mar. 30, 2011

(65) Prior Publication Data

US 2012/0253762 A1 Oct. 4, 2012

(51) Int. Cl.
- *G06F 7/60* (2006.01)
- *G06F 17/10* (2006.01)
- *G01V 11/00* (2006.01)

(52) U.S. Cl.
CPC .......... *G01V 11/00* (2013.01); *G01V 2210/665* (2013.01); *G01V 2210/661* (2013.01)
USPC .......................................................... 703/2

(58) Field of Classification Search
CPC ............ G01V 11/00; G01V 2210/665; G01V 2210/661
USPC .......................................................... 703/2
See application file for complete search history.

(56) References Cited

U.S. PATENT DOCUMENTS

| | | | |
|---|---|---|---|
| 6,606,584 B1 * | 8/2003 | Junkins | 703/1 |
| 6,801,883 B1 * | 10/2004 | Hurlock | 703/2 |
| 2003/0105788 A1 * | 6/2003 | Chatterjee | 708/402 |
| 2003/0176974 A1 * | 9/2003 | Baliguet et al. | 702/14 |
| 2004/0225483 A1 * | 11/2004 | Okoniewski et al. | 703/2 |
| 2005/0276504 A1 * | 12/2005 | Chui et al. | 382/264 |
| 2009/0240438 A1 * | 9/2009 | Wang et al. | 702/14 |
| 2010/0223237 A1 * | 9/2010 | Mishra et al. | 707/693 |

FOREIGN PATENT DOCUMENTS

| | | |
|---|---|---|
| EP | 0766223 A2 | 4/1997 |
| JP | 07-087489 A | 3/1995 |
| JP | 2005-269618 A | 9/2005 |

\* cited by examiner

*Primary Examiner* — Dwin M Craig
(74) *Attorney, Agent, or Firm* — Marie L. Clapp

(57) ABSTRACT

A method and corresponding system is provided for computation utilizing an earth model representation via a computing system having a first processor having access to an earth model dataset. The method includes compressing the earth model dataset at the first processor to generate a look-up table and a set of data indices (i.e., collectively a compressed earth model representation), wherein the look-up table includes quantized data values. By then storing the look-up table in a first level ("fast") memory, and storing the indices in a second level ("slower," higher memory capacity) memory, the look-up table and the indices can be accessed to selectively decompress the compressed earth model representation at the first processor such that the computation can be performed efficiently by the first processor.

29 Claims, 7 Drawing Sheets

SYSTEM AND METHOD FOR COMPUTATIONS UTILIZING OPTIMIZED EARTH MODEL REPRESENTATIONS

FIELD OF THE DISCLOSURE

This disclosure relates generally to the processing of earth model data, and more particularly to a system and method for improving the efficiency of computations utilizing earth model representations.

BACKGROUND OF THE DISCLOSURE

Seismic processing operations, such as forward modeling and migration, require the storage of earth model parameters such as velocity, density, anisotropy parameters, etc. For complex modeling problems, optimal storage of earth model parameters requires large amounts of data storage capacity.

Known methods for complex earth modeling problems utilize standard compression methods such as wavelet or JPEG compression. Conventional compression methods, however, were developed largely to minimize the amount of required data storage, and not to maximize the accuracy and computational efficiency of the earth modeling, or to minimize the cost of decompression.

As such, a need exists for optimal compression and decompression of earth model datasets for use in computation. By optimally compressing and selectively decompressing the data, data storage requirements and costs can be reduced while improving computational efficiency.

SUMMARY

A method is disclosed for computation utilizing an earth model representation by a first computer processor having access to an original earth model dataset. By way of example, the original earth model dataset may include uncompressed or previously compressed earth model data. The first processor is operatively in communication with at least two memories, a first level memory and a second level memory, wherein second level memory is slower but with higher memory capacity than the first level memory.

In accordance with one embodiment of the invention, the method includes the step of compressing the earth model dataset by using the first processor to generate a look-up table and a plurality of data indices (i.e., the look-up table and indices collectively referred to a "compressed earth model representation"), wherein the look-up table includes quantized data values. The look-up table is stored in the first level memory, and the indices are stored in the second level memory. The method then includes the step of accessing the look-up table from the first level memory and the indices from the second level memory to selectively decompress the compressed earth model representation at the first processor and to enable the computation via utilization of the decompressed earth model representation by the first processor.

The method of the present invention permits a single compression of the original earth model dataset so that it may be stored in local memory of a computer processor and selectively decompressed, repeatedly as may be required, using a look-up table. By accessing the look-up data and indices, and decompressing at the processor, decompressed earth model data resides only on the processor performing the computation, and thus is never read from an external memory. As such, the size of the earth model that can be resident in the local memory of the processing device is greatly increased, the rate at which earth model data can be accessed is increased, and computational performance is improved in comparison to the conventional storing and accessing earth model data from/to external memory devices, or the decomposing and distributing earth modeling problems across multiple computational nodes or processors in communication with each other. In accordance with the present invention, certain selected subsets of earth model data may be accessed without decompressing the entire dataset during the computation.

Advantageously, the present invention may be used to increase the speed and reduce the cost of computations requiring the use of earth model data, including but not limited to seismic imaging, forward modeling, seismic migration, waveform inversion and trace interpolation. The method is optimized for decompression, which can be performed repeatedly and efficiently at the processor, since decompression requires only a single look-up to be performed using the first level (fast) memory. Compression is performed once and can be arbitrarily complex provided the result is a look-up table and plurality of index values.

Compression of the earth model dataset may include non-uniform quantization for optimizing the representation of important or preferred earth model data values to be used in the computation. Non-uniform quantization techniques may include one or a combination of cubic, adaptive or guided adaptive techniques, depending on the type of earth model employed. Earth model data values of the look-up table may represent selected earth model parameters and include one or more of derived, scalar and vector values.

Compression of the earth model data may also include a dithering step for randomizing the quantized data values of the look-up table. The dithering may be performed to improve accuracy in large-scale properties of a subsurface medium, which may be different from the earth model data values actually being compressed. For example, in compression of earth model velocity data, dithering may be used to better preserve the distribution of slowness through the subsurface media, or to better preserve the relationship among anisotropy parameters.

Optionally, and in accordance with another embodiment of the present invention, a second "accelerator" processor is provided having a first level memory and a second level memory, the second level memory being larger and slower than the first level memory. Advantageously, the look-up table is instead stored in the first level memory of the second processor, and the indices are instead stored in the second level memory of the second processor. The look-up table and the indices are then accessed from the first level and second level memories of the second processor, respectively, to selectively decompress the compressed earth model representation at the second processor instead of the first processor. This enables the second processor to provide a more efficient computation utilizing the earth model representation.

In accordance with another embodiment of the invention, a system for computation utilizing an earth model representation includes a first level memory, a second level memory being slower but with a higher memory capacity than the first level memory, and a first processor having access to an earth model dataset, and wherein the first processor being operatively in communication with the first level memory and the second level memory. The system further includes computer readable media accessible by the first processor, and includes computer readable code for: (1) compressing the earth model dataset at the first processor to generate a compressed earth model representation, wherein the a compressed earth model representation includes a plurality of data indices and a look-up table having quantized data values; (2) storing the look-up table in the first level memory; (3) storing the indices in the second level memory; and (4) accessing the look-up table from the first level memory and the indices from the second level memory to selectively decompress the compressed earth model representation at the first processor to enable the computation utilizing the decompressed earth model representation by the first processor.

The first processor may be a central processing unit (CPU), the first level memory may be cache memory such as a level-one (L1) cache memory, and the second level memory may be a random access memory (RAM).

In another embodiment, the system further includes a second processor in communication with the first processor, the second processor having a first level memory and a second level memory, the second level memory of the second processor being slower but with a higher memory capacity than the first level memory of the first processor. The computer readable media is accessible by one or both of the first and second processors, and further includes computer readable code for: (1) storing the look-up table in the first level memory of the second processor instead of the first level memory of the first processor; (2) storing the indices in the second level memory of the second processor instead of the second level memory of the first processor; and (3) accessing the look-up table and the indices from the first level and second level memories of the second processor, respectively, to selectively decompress the compressed earth model representation at the second processor instead of the first processor to enable the computation by the second processor instead of the first processor.

The second processor may be a graphics processing unit (GPU), the first level memory may include shared memory, and the second level memory may include global memory. Alternatively, the second processor may be a field-programmable gate array (FPGA), the first level memory may include a Block RAM (BRAM), and the second level memory may include a dynamic RAM (DRAM) memory.

In accordance with yet another embodiment of the present invention, an article of manufacture includes a computer readable medium having a computer readable code for executing a method for computation utilizing an earth model representation. The method comprises: (1) compressing an earth model dataset at the first processor to generate a compressed earth model representation, wherein the compressed earth model representation includes a plurality of data indices and a look-up table having quantized data values; (2) storing the look-up table in the first level memory; (3) storing the indices in the second level memory; and (4) accessing the look-up table from the first level memory and the indices from the second level memory to selectively decompress the compressed earth model representation at the first processor to enable the computation by the first processor.

Optionally, the article of manufacture may also include computer readable code for: (1) storing the look-up table in a first level memory of a second processor instead of the first level memory of the first processor; (2) storing the indices in a second level memory of the second processor instead of the second level memory of the first processor; and (3) accessing the look-up table and the indices from the first level and second level memories of the second processor, respectively, to selectively decompress the compressed earth model representation at the second processor instead of the first processor to enable the computation by the second processor instead of the first processor.

BRIEF DESCRIPTION OF THE DRAWINGS

A detailed description of the present invention is made with reference to specific embodiments thereof as illustrated in the appended drawings. The drawings depict only typical embodiments of the invention and therefore are not to be considered to be limiting of its scope.

DESCRIPTION OF THE INVENTION

Figure 1:
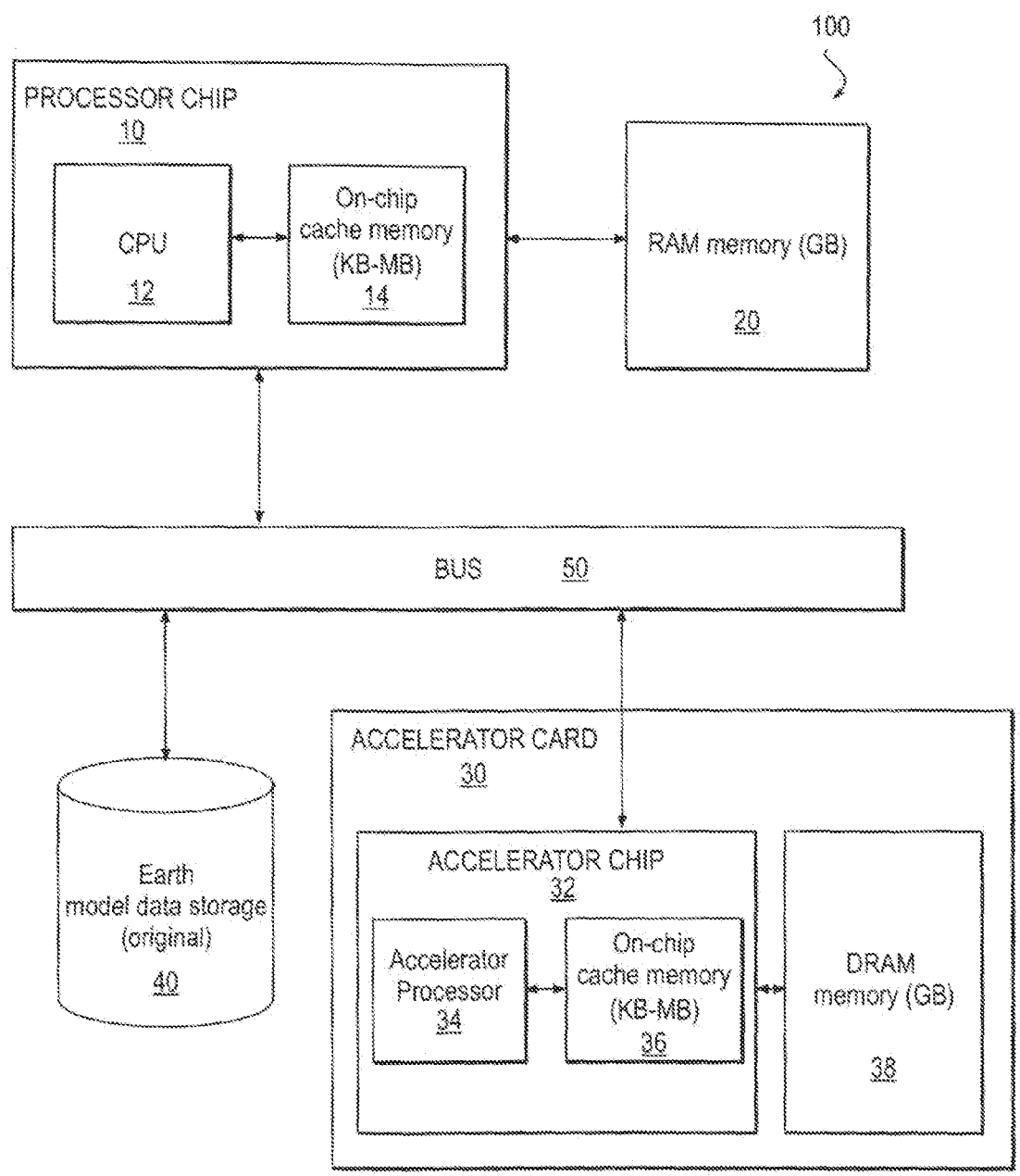
FIG. 1 illustrates a system configured to improve the efficiency of computations by utilizing earth model representations in accordance with an embodiment of the present invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multi-processer computer processors system, hand-held devices, programmable consumer electronics, mini-computers, mainframe computers, supercomputers, and the like. The invention may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

FIG. 1 is a block diagram of a computing system 100 configured to improve the efficiency of computations, such as forward modeling and migration, which utilize earth model data. The computing system 100 includes at least one computing device or processor chip 10 having a general purpose computer processor 12, such as a central processing unit (CPU) 12, coupled to a first level memory device 14 and an external second level memory device 20, wherein the second level memory device 20 is slower but with a higher memory capacity than the first level memory 12. The first level memory device 14, by way of example, can be an on-chip level-one cache memory of the CPU 12. The first level memory device 14 is preferably the fastest memory device available to the CPU 12, and is capable of storing at least kilo-bytes of data. The second level memory device 20, by way of example, can be a random access memory device coupled to the first processor chip 10.

The system 10 further includes a data storage device or database 40 for storing original earth model data, and a bus 50 for allowing communication between the computing device 10 and the database 40. By way of example and not limitation, the earth model data from database 40 may contain acoustic model parameters, vertical transverse isotropy (VTI) model parameters, tilted transverse isotropy (TTI) model parameters, variable density TTI model parameters, elastic model parameters, or visco-elastic model parameters.

Optionally, an "accelerator" card 30 may be operatively coupled to the processor chip 10 and database 40 via the bus 50. The accelerator card 20 includes an accelerator chip 32, which in turn includes a compute device or second processor 34, an on-chip memory device 36, and an accelerator card memory device 38 coupled to the on-chip memory device 36. The accelerator on-chip memory device 36 is a first level memory, and the accelerator card memory device 38 is a second level memory, wherein the second accelerator card memory device 38 is slower but with a higher memory capacity than the on-chip memory device 36. In one embodiment of the present invention, the accelerator compute device 32 is a graphics processing unit (GPU), the first level memory 36 is a GPU shared memory, and the second level memory 38 is a GPU global memory. In another embodiment of the present invention, the accelerator compute device 32 is a field-programmable gate array (FPGA), the first level memory 36 is a Block RAM (BRAM) memory, and the second level memory 38 is a dynamic (DRAM) memory.

Figure 2:
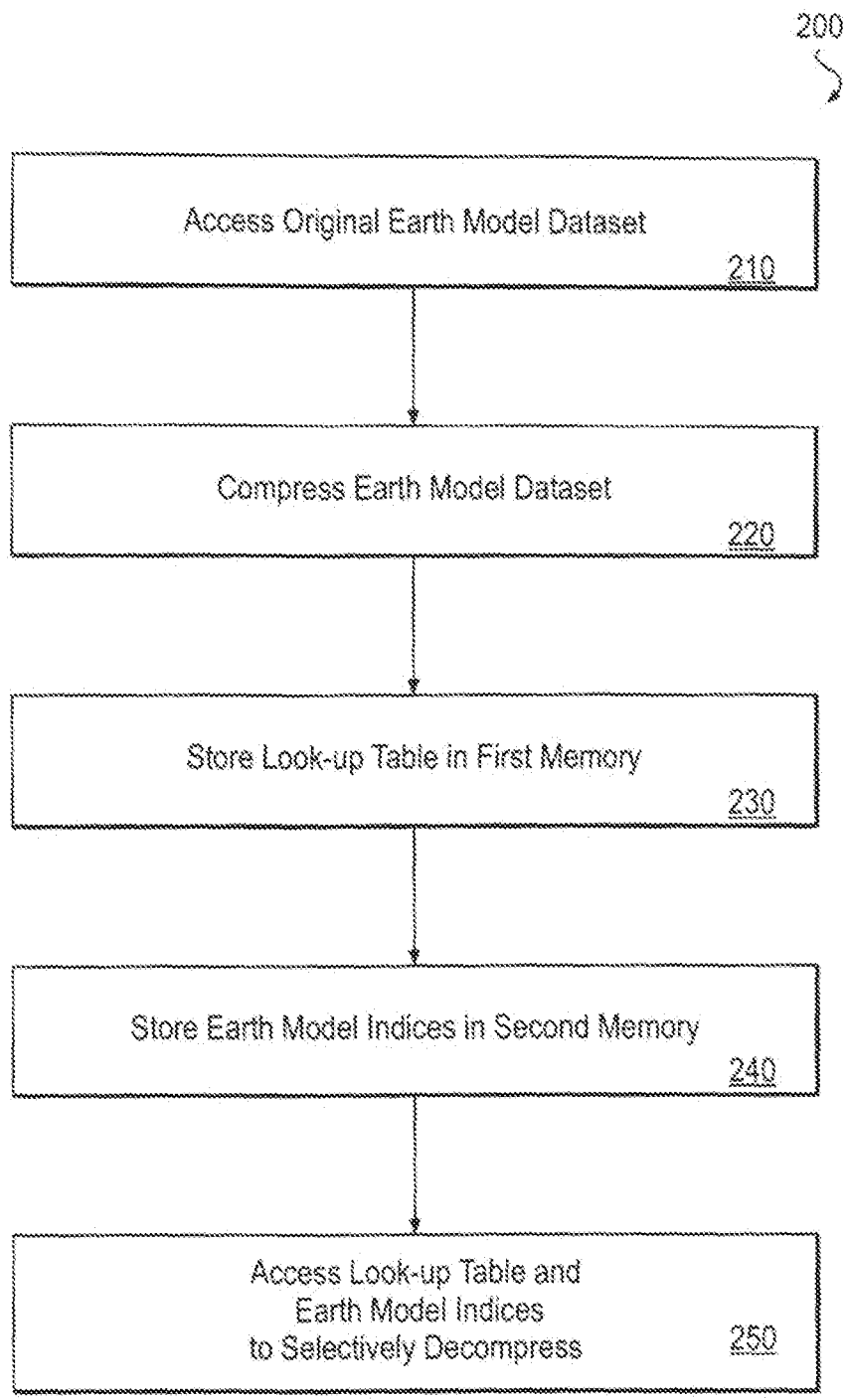
FIG. 2 is a flow diagram for a method for computations utilizing earth model representations in accordance with an embodiment of the present invention.

FIG. 2 is a flow diagram for a method 200 for computation utilizing an earth model representation that can be implemented by the system 100 described with reference to FIG. 1. In accordance with one embodiment of the present invention, the method 200 includes step 210 of accessing from the data source 40 an original earth model dataset, which by way of example can be an uncompressed or previously compressed earth model dataset, and step 220 of compressing the earth model dataset. Compression step 220, performed by the CPU 12, generates a look-up table having quantized data values, and a plurality of data indices for each point in the volume of interest. In accordance with the present invention, an earth model parameter in compressed form can be represented with a lookup table and, for each point in the volume, an index into the table (wherein the look-up table and indices are collectively referred to as a "compressed earth model representation." For example, when quantizing an earth model parameter that is stored in IEEE single-precision floating-point (4 bytes) to 256 values, then each point in the volume would require an 8-bit index (1 byte), giving an effective compression ratio of nearly 4:1. As such, the actual memory required for compressing an $N^3$-point model with a c-entry table would be equal to $[\log_2(c)] \times N^3$ bits.

The data values of the look-up table can be one or a combination of scalar, vector and derived values, and represent uniformly or non-uniformly quantized values of the uncompressed earth model data in database 40. Scalar values are single quantities, vector values are multiple quantities which are correlated and which can be "co-compressed" and "co-decompressed" in parallel, and derived values are multiple values (e.g., sine q, cosine q) determined from the look-up table and a single index (q). Non-uniformly quantized values can be determined, for example, by using cubic, adaptive, guided adaptive quantization techniques as described below with reference to FIG. 6. The quantized values can also be randomized during the compression step 220 to prevent gradients in the uncompressed earth model dataset from being transformed into artificial sharp edges in the compressed earth model representation. For certain multiple earth model parameters of the earth model dataset, the compression algorithm may take into account constraints and/or physical rules for consistency between those parameters. Vector values of the earth model dataset can be compressed in parallel ("co-compressed"), and vector values of the compressed earth model representation can be decompressed in parallel ("co-decompressed").

Referring again to FIG. 2, the look-up table is then stored in the first level memory 14, step 230, and the indices stored in the second level memory 20. The look-up table and indices are then accessed by the CPU 12 from their respective memories and both are used to selectively decompress the compressed earth model representation, step 250. Computations, such as forward modeling and migration, are then performed at the CPU 12 using the decompressed earth model representation.

Where an accelerator card 30 is provided, the look-up table may be stored in the first level memory 36 of the accelerator chip 32, and the compressed earth model representation stored in the second level memory 38 of the accelerator card 32. Preferably, for example in the case where an FPGA is the accelerator processor 34, the look-up table and compressed earth model representation are used by the FPGA processer 34 to decompress the earth model representation to perform the computation, which itself utilizes the decompressed earth model representation at the FPGA processor 34.

The method 200 as described with reference to FIG. 2 is advantageous in performing seismic processing operations like forward modeling or migration, where for example many earth model parameters such as velocity, density, anisotropy parameters, and others, are used. For complex earth modeling problems, decompressed model parameters require large amounts of data storage in local memory. The method of the present invention is more efficient than conventional methods in that compression can be performed only once, while decompression can be performed efficiently many times over during the course of the computation (e.g., forward modeling, migration, etc.) by accessing the look-up table from the first (fast) level memory. Because the earth model does not typically change during a computation that utilizes earth model data, the compression schemes can be designed to be complex and executed only once, while the decompression scheme can be designed to be simple and as fast as possible. The compression scheme also allows random access into the compressed volume rather than requiring the entire volume (or blocks of the volume) to be decompressed in order to access a single point of the earth model.

In accordance with one embodiment of the present invention, the compression step 220 can achieve a 4:1 compression that quantizes an earth model parameter for a given point into at least 256 unique values, represented in a look-up table by an 8-bit look-up index. Thus, instead of storing the full 32-bit values, it is necessary to store only an 8-bit index for each point, achieving a 4× reduction in storage requirements. Higher compression ratios can be achieved using a smaller number of index bits, and lower compression ratios can be achieved using a large number of bits in the look-up index. Decompression only requires a single table look-up, a very inexpensive operation. On a CPU, the look-up table can be stored in cache, on a GPU in shared memory, or on FPGA a single "block RAM".

By way of example, with an 8-bit index, two parallel decompression operations can be performed using a single accelerator processing chip, such as a Xilinx™ Virtex-5 FGPA having an on-chip dual-port BRAM. With such BRAM, 512 32-bit values can be stored with two parallel memory accesses per cycle. With a 4:1 compression ratio, each BRAM can store two different 256-sized earth model decompression look-up tables. For example, a single BRAM can be used to decompress one point of the B (buoyancy) and one point of the K (bulk modulus) earth model arrays. Since individual earth model points are independent, decompressing multiple points in parallel simply requires the use of multiple BRAMs, e.g., 4 BRAMs can be used to decompress 4 values of B and K in parallel.

Because compression of the original earth model dataset is performed on the CPU (or alternatively on the accelerator processor), it is possible to optimize the compression scheme to particular earth models. Exemplary "custom" compression schemes for selected earth models will be described below. However, irrespective of the model-dependent compression scheme, dithering can be applied during the compression step 220 to avoid the introduction of artifacts at large scales due to the quantization of the earth model.

Figure 3:
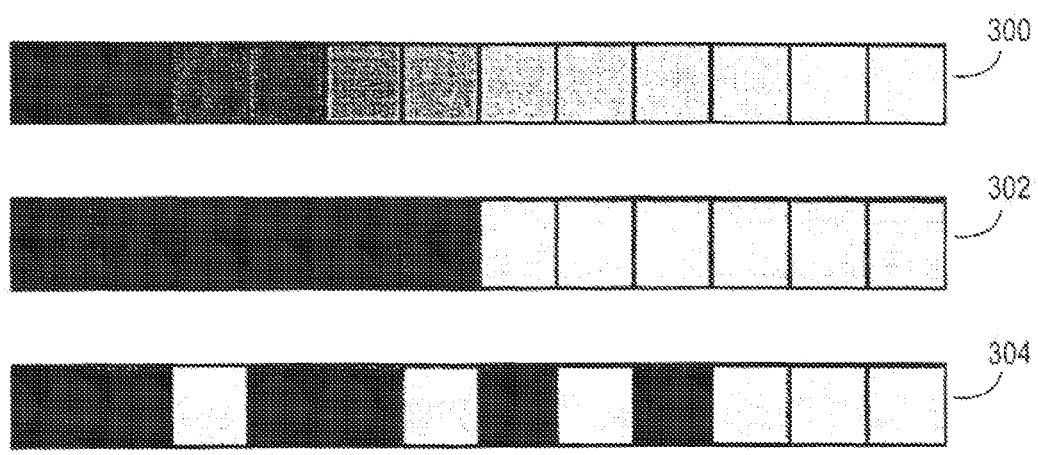
FIG. 3 is a diagram showing the effect of applying weighted random dithering when quantizing uncompressed earth model data.

FIG. 3 is a diagram showing the effect of applying weighted random dithering when quantizing the original earth model dataset from database 40. When the original data 300 represents a gradient, naïve quantization produces a compressed earth model representation which can lead to geophysical artifacts as shown by 302. Applying dithering 304 corrects for these artifacts.

In accordance with an embodiment of the present invention, the dithering step works as follows. Where an earth model dataset value cannot be represented exactly in the quantized space, the choice between the two nearest values is probabilistically determined with a random value. Such random rounding prevents gradients in the original data from being transformed into sharp edges in the compressed earth model representation, and avoids the artifacts in the output that such artificial sharp edges produce. Over a particular region, e.g., an average wavelength, bulk properties of the medium can be maintained, which can greatly improve the overall accuracy of the earth modeling.

Figure 4:
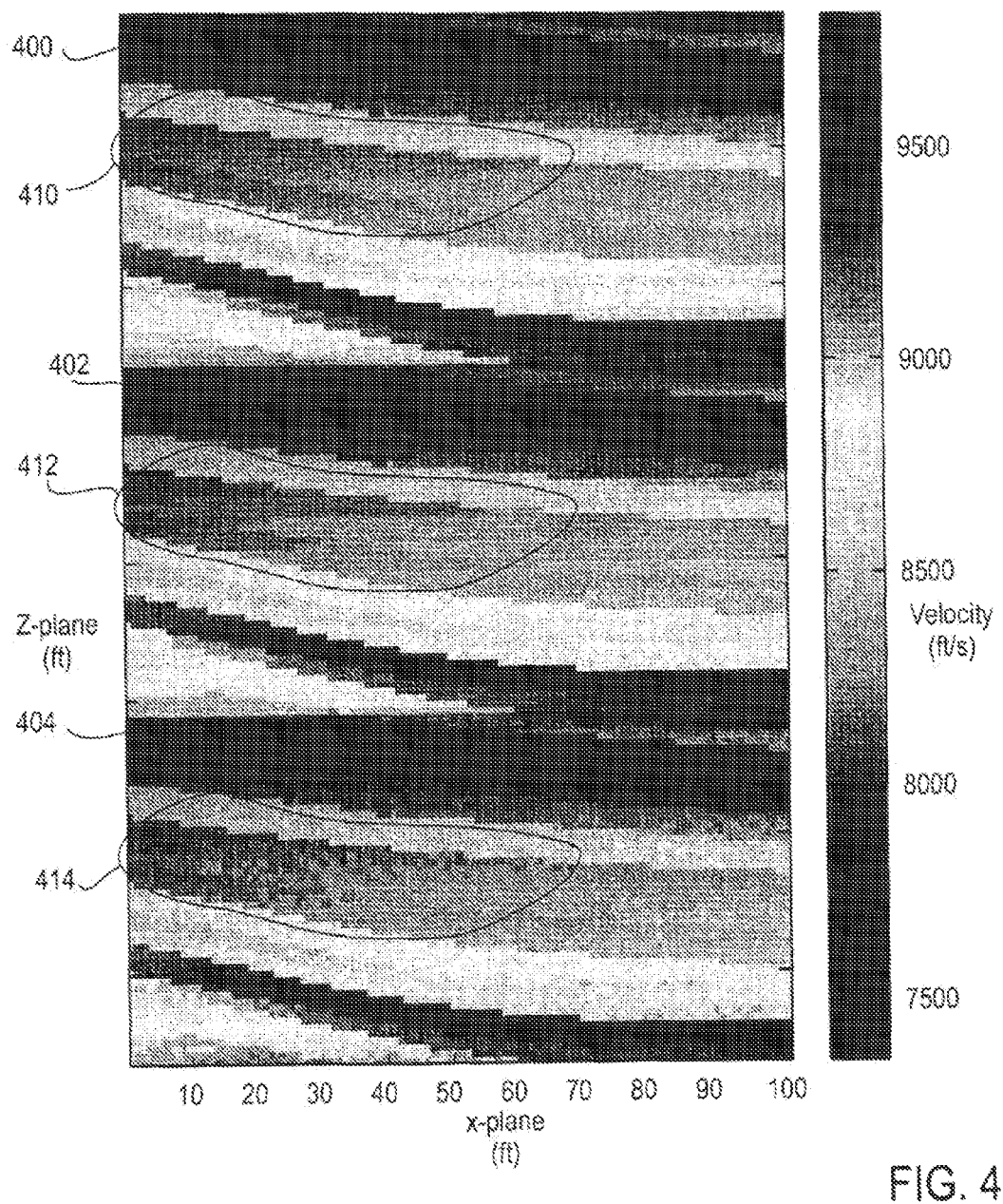
FIG. 4 shows a sample original (uncompressed) earth model data parameter, decompressed earth model representation (without dithering), and decompressed earth model representation (with dithering).
Figure 5:
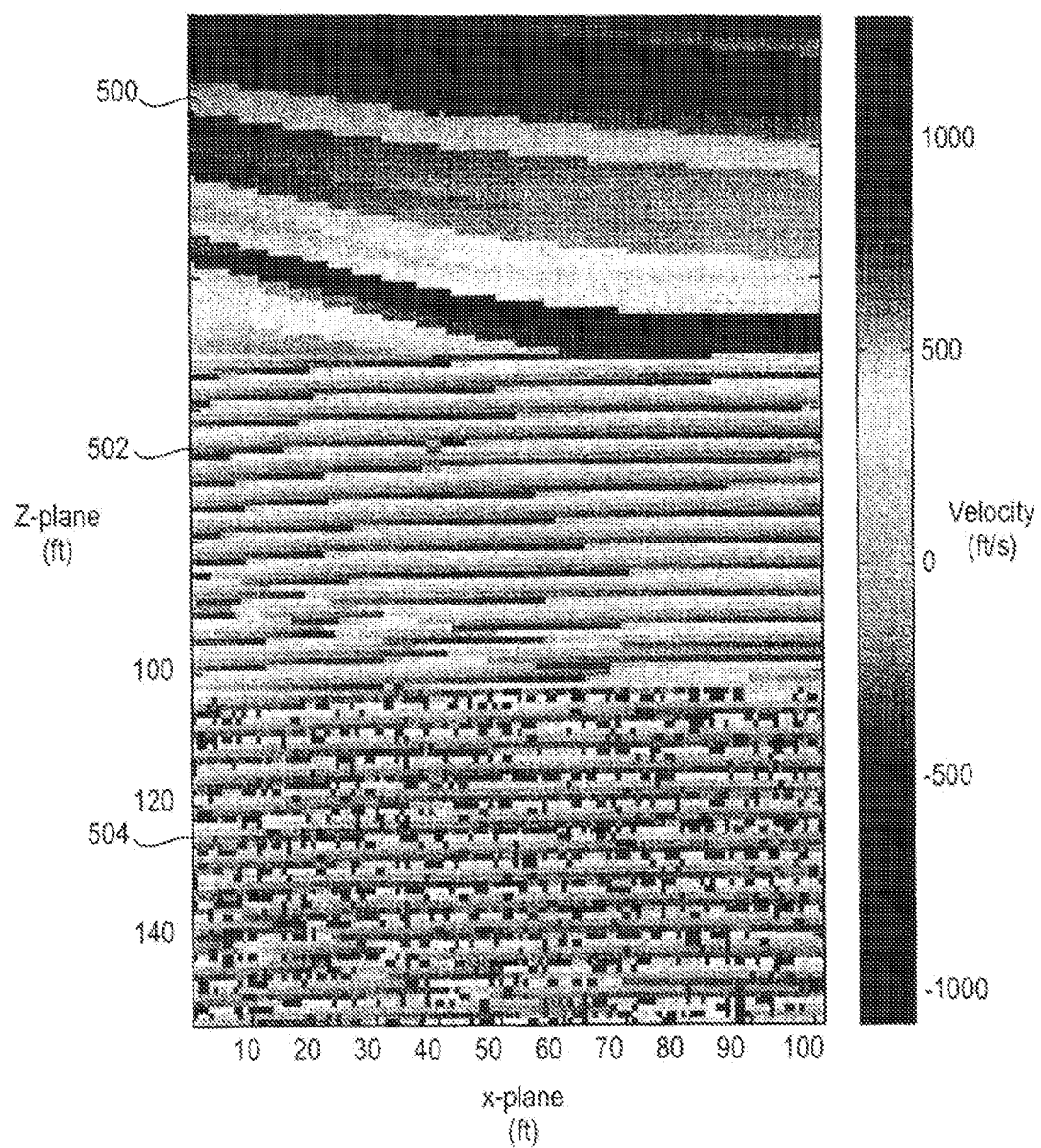
FIG. 5 shows the sample original (uncompressed) earth model data parameter of FIG. 5, and differences between a decompressed earth model representation (without dithering), and between a by a decompressed earth model representation (with dithering).

FIG. 4 shows original earth model dataset 400 and effects of "discretization without dithering" 402 and "discretization with dithering" 404 on the earth model representation. Note the artificial sharp edges in region 412 versus the smoother transitions in region 410. With dithering, as shown by region 414, the sharp transitions are minimized. FIG. 5 shows the error (difference) between the original earth model data 500 and the decompressed earth model representation (without dithering) 502 and decompressed earth model representation (with dithering) 504.

Referring again to FIG. 2, the compression step 220 can utilize uniform and non-uniform quantization. A simple compression scheme can utilize uniform quantization to convert from 32-bit floating point to a compressed format, for example, 8-bit. With such an approach, however, errors in earth modeling may arise in part for example because of uniform compression of bulk modulus and buoyancy earth model parameters. The impact of quantizing bulk modulus uniformly for example can result in a highly uneven distribution of values wherein many bins are not used at all. Bulk modulus has been found to have a range (i.e., difference between minimum and maximum values) of about 25× the minimum value, compared to velocity which has a range of about 3×. This means that with a uniform quantization each bin must represent many more values, which causes a significant loss of precision in the computations utilizing earth model representations.

As such, non-uniform quantization may be used during the compression step 220 to minimize the loss of precision in the compression that lead to errors in the computation utilizing the decompressed earth model representation. In accordance with one embodiment of the present invention, a cubic quantization method can be used as part of the compression step 220. In the case of acoustic isotropic modeling, for example, the cubic quantizing can include the steps of using the cube root of minimum and maximum values for bulk modulus, defining bins uniformly in the "cube root domain, and then cubing the bin values to derive the true values for bulk modulus. This approach is designed to exploit the fact that bulk modulus can be correlated with the cube of wave velocity in the acoustic isotropic model.

Alternatively, adaptive quantizing may be used as a form of non-uniform quantization. By way of example, the adaptive quantizing approach may include the steps of placing all uncompressed earth data points in one bin, repeatedly splitting the bin containing the most (squared) error in two until a desired number of bins is reached.

A guided adaptive quantization method is also disclosed, which can be initiated via a number of user-specified parameter values, for example water velocity and salt velocity. These values are assigned quantization bins, and all data points that do not match these values are placed into another bin. Next, the total squared error (i.e., sum of squared absolute differences between quantized values and original values) are computed for each bin, and the quantization bin with the largest error is split it into two bins. The values from the original bin between the two new bins are then redistributed, and method repeated until the desired number of quantization bins has been reached, or until the total error in all bins is zero. This method ensures accurate representation of particularly significant values, such as water velocity, and a minimized total error for other values in the volume.

The difference between the adaptive and guided adaptive schemes is that the latter implements the adaptive strategy of repeatedly splitting the bin containing the most (squared) error in two until the required number of bins is reached), but in addition assigns a certain number of compression values to any given parameter range. The compression values represent a priori knowledge of earth parameters to guide adaptive process by providing starting conditions. As such, the compression density and tolerance can be regulated on an interval basis. The scheme can be run either with or without randomized dithered rounding as described above. This method also takes particular advantage of the simplicity of the table look-up decompression method, as represented values can be arbitrarily selected.

Similar logic can be applied for other earth model parameters such as the elastic parameters to represent them using a smaller number of bits. Again, represented values in the multi-dimensional parameter space can be arbitrarily chosen to prevent representation of non-physical parameter values, or values which lead to instability in the computation.

Figure 6:
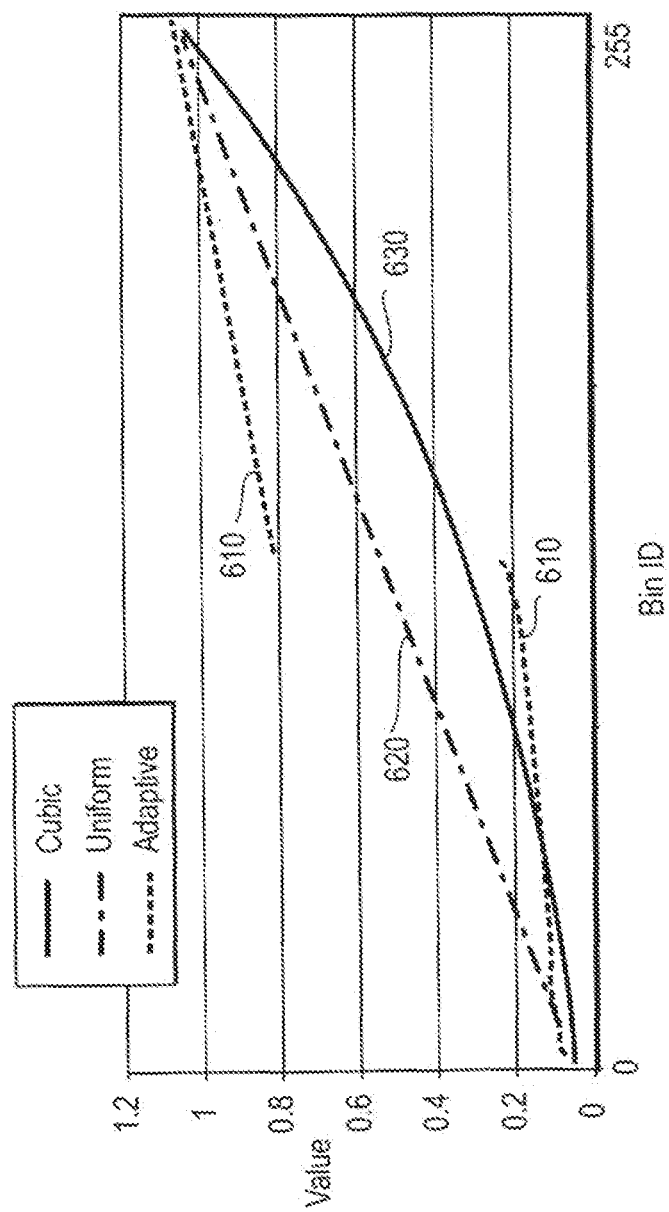
FIG. 6 is a diagram showing the impact of different quantization schemes on earth model data bin distribution.

FIG. 6 shows a comparison of the bin distribution produced by the uniform, cubic and adaptive quantization schemes in accordance with embodiments of the present invention. Curve 610 shows a representative bin distribution for uniform quantization, curve 620 shows a representative bin distribution for cubic quantization, and 630 shows a representative bin distribution for adaptive quantization.

Figure 7:
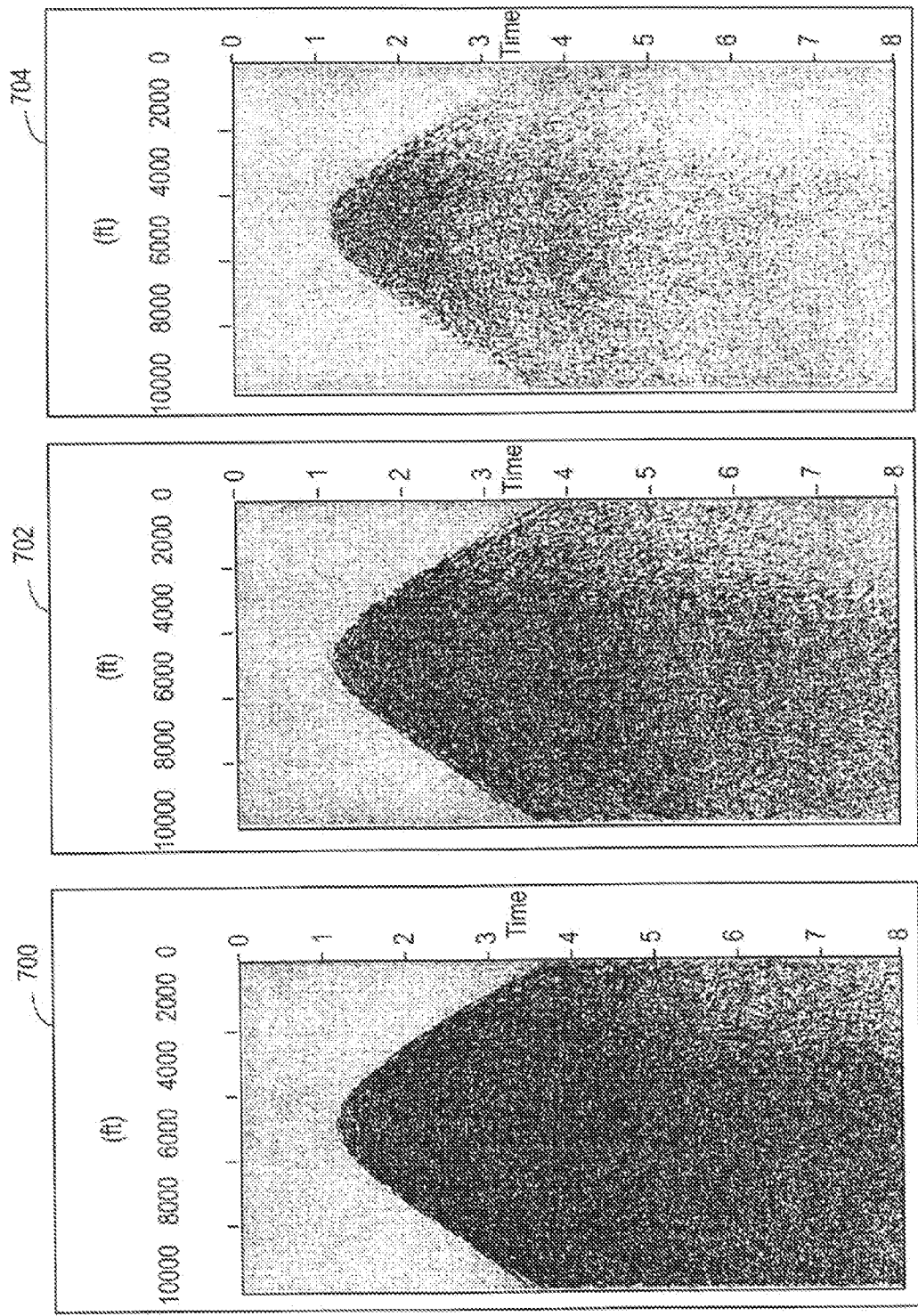
FIG. 7 is a comparison of errors in acoustic forward modeling results utilizing earth model representations with different quantization schemes.

FIG. 7 shows a comparison of error introduced in computation utilizing earth model representations with the uniform 700, cubic 702 and adaptive quantization schemes described above. FIG. 7 shows the difference (×100) between CPU and CPU with earth model compression for the three different compression schemes. Assessed using an error metric, the cubic scheme 702 offers a 2.1× reduction in error compared to uniform quantization 700, while the adaptive scheme 704 provides a 7.2× reduction in the error compared to the uniform quantization 700.

Exemplary compression schemes are now disclosed for VTI anisotropic, TTI, and variable density TTI earth models.

The case of VTI modeling, three earth model parameters require quantization: velocity, eta and delta. Eta and delta have restricted range and precision that could be exploited to increase their compression ratio. Accordingly, as shown in Table 1 below, all three VTI anisotropic earth model parameters can be stored using no more than 16-bits of compressed model data as shown in Error! Reference source not found. Eta and Delta parameters are imprecisely known and only require low precision for their representation.

TABLE 1

Compressed representation for VTI earth model parameters.

| | Minimum | Maximum | Uniform Resolution | Number of bits |
|---|---|---|---|---|
| Velocity | 4800 | 15000 | 10-20 | 8-10 |
| Eta | 0 | 0.5 | 0.03-0.05 | 4 |
| Delta | 0 | 0.1 | 0.33 | 2 |

By comparison, TTI earth models have five model parameters. To optimize the earth model compression for TTI models, different levels of quantization are used for the different TTI model parameters based on the relative accuracy with which they are known. See Table 2 below. The most accuracy is preserved for velocity (ft/s).

TABLE 2

Compression levels for different TTI earth model parameters.

| Model Parameter | Minimum | Maximum | Uniform Resolution | Accuracy required | Compressed bits | Compression ratio |
|---|---|---|---|---|---|---|
| Velocity | 4800 | 15000 | ~10 | High | 10 | 3.2 x |
| Eta | 0 | 0.5 | 0.033 | Moderate | 4 | 8 x |
| Delta | 0 | 0.1 | 0.033 | Low | 2 | 16 x |
| Azimuth | 0 | 360 | 11.25 degree | Moderate | 5 | 6.4 x |
| Tilt | −90 | 90 | 5.6 degree | Moderate | 5 | 6.4 x |
| All Parameters | | | | — | 26 | 6.2 x |

The TTI compression summarized in Table 1 was performed for a fourth order in time, twelfth order in space application utilizing single precision arithmetic. Six wavefield volumes were used for computation, requiring a total memory requirement of 4-bytes per point for 11 arrays, or $44 \times N^3$ bytes (where N is a spatial dimension). For N=1000, 44 GB of memory were required. By using a combination of uniform and non-uniform quantization, an overall 6-7× compression was achieved for the five TTI model parameters. Compressed in this way, a full set of TTI earth model parameters can be represented in 3 bytes per point, which reduces the overall memory required for the computation for N=1000 to 27 GB. If in addition we apply a 2:1 wavefield compression, the storage requirement can be reduced to 15 GB.

To further optimize the computation utilizing the earth model representation, each model "compressed value" is decompressed multiple times, producing different versions of the same model parameters. For example, from the same input of "compressed q", we can decompress to generate q, and derived values sine q, sine 2q, cosine 2q—with each output requiring only one lookup table on the FPGA.

For a variable density TTI modeling application, an additional earth model parameter (density) is required as shown in Table 3 below. The 6 earth model parameters can be compressed in 32 bits, which is typically the number of bits and thus cost of storing one model parameter.

TABLE 3

Compression levels for different variable-density TTI model parameters.

| Model Parameter | Minimum | Maximum | Uniform Resolution | Accuracy required | Compressed bits | Compression ratio |
|---|---|---|---|---|---|---|
| Velocity | 4800 | 15000 | ~10 | High | 10 | 3.2 x |
| Eta | 0 | 0.5 | 0.033 | moderate | 4 | 8 x |
| Delta | 0 | 0.1 | 0.033 | Low | 2 | 16 x |
| Azimuth | 0 | 360 | 11.25 degrees | moderate | 5 | 6.4 x |
| Tilt | −90 | 90 | 5.6 degrees | moderate | 5 | 6.4 x |
| Density | 1.0 | 4.2 | 0.1 | moderate | 6 | 5.x |
| All Parameters | | | | — | 32 | 6 x |

Notwithstanding that the present invention has been described above in terms of alternative embodiments, it is anticipated that still other alterations, modifications and applications will become apparent to those skilled in the art after having read this disclosure. For example, it is to be understood that the present invention contemplates that, to the extent possible, one or more features of any embodiment can be combined with one or more features of any other embodiment. It is therefore intended that such disclosure be considered illustrative and not limiting, and that the appended claims be interpreted to include all such applications, alterations, modifications and embodiments as fall within the true spirit and scope of the invention.

What is claimed is:

1. A method for computation utilizing an earth model representation, the method being executed via a computing system having a first processor having access to an earth model dataset, the first processor being operatively in communication with a first level memory and a second level memory, the second level memory being slower but with a higher memory capacity than the first level memory, the method comprising:
   compressing the earth model dataset via the first processor to generate a compressed earth model representation, the compressed earth model representation comprising a plurality of data indices and a look-up table comprising quantized data values, by quantizing the earth model dataset to generate at least one of the quantized data values;
   storing the look-up table in the first level memory;
   storing the indices in the second level memory; and
   accessing the look-up table from the first level memory and the indices from the second level memory to selectively decompress the compressed earth model representation at the first processor to enable the computation by the first processor.

2. The method according to claim 1, wherein the compressing step comprises non-uniformly quantizing the earth model dataset to generate at least one of the quantized data values.

3. The method according to claim 2, wherein the non-uniformly quantizing step comprises using a cubic quantization.

4. The method according to claim 2, wherein the non-uniformly quantizing step comprises using an adaptive quantization.

5. The method according to claim 2, wherein the non-uniformly quantizing step comprises using a guided adaptive quantization.

6. The method according to claim 1, wherein the compressing step comprises uniformly quantizing the earth model dataset to generate at least one of the quantized data values.

7. The method according to claim 1, wherein the earth model dataset comprises a plurality of earth model parameters, and wherein the compressing step comprises compressing at least two of the earth model parameters to assure consistency with constraints.

8. The method according to claim 1, wherein the earth model dataset comprises a plurality of earth model parameters represented by a plurality of vector values, and wherein the compressing step comprises compressing the vector values in parallel.

9. The method according to claim 1, wherein the compressed earth model representation comprises a plurality of vector values, and wherein the vector values are decompressed in parallel.

10. The method according to claim 1, wherein the compressing step further comprises dithering the quantized data values of the look-up table to improve accuracy in the computations.

11. The method according to claim 1, wherein the first processor comprises a central processing unit (CPU) and the first level memory comprises a cache memory.

12. The method according to claim 1, further comprising:
   a second processor in communication with the first processor, the second processor having a first level memory and a second level memory, the second level memory of the second processor being slower but with a higher memory capacity than the first level memory of the second processor; and
   wherein the look-up table is instead stored in the first level memory of the second processor, the indices are instead stored in the second level memory of the second processor, and wherein the look-up table and the indices are instead accessed from the first level and second level memories of the second processor, respectively, to selectively decompress the compressed earth model representation at the second processor instead of the first processor and to enable the computation by the second processor instead of the first processor.

13. The method according to claim 12, wherein the second processor comprises a graphics processing unit (GPU) and the first level memory comprises a shared memory.

14. The method according to claim 12, wherein the second processor comprises a field-programmable gate array (FPGA) and the first level memory comprises a Block RAM (BRAM).

15. The method according to claim 1, wherein the data values of the look-up table comprise one or more of derived, scalar and vector values.

16. The method according to claim 1, wherein the earth model dataset comprises acoustic model parameters.

17. The method according to claim 1, wherein the earth model dataset comprises vertical transverse isotropy (VTI) model parameters.

18. The method according to claim 1, wherein the earth model dataset comprises tilted transverse isotropy (TTI) model parameters.

19. The method according to claim 1, wherein the earth model dataset comprises variable density TTI model parameters.

20. The method according to claim 1, wherein the earth model dataset comprises elastic model parameters.

21. The method according to claim 1, wherein the earth model dataset comprises visco-elastic model parameters.

22. The method according to claim 1, wherein the computation comprises seismic processing.

23. A system for computation utilizing an earth model representation, comprising:
- a first level memory;
- a second level memory being slower but with a higher memory capacity than the first level memory;
- a first processor having access to an earth model dataset, the first processor being operatively in communication with the first level memory and the second level memory;
- non-transitory computer readable media accessible by the first processor, the computer readable media comprising computer readable code for:
  - compressing the earth model dataset at the first processor to generate a compressed earth model representation, the compressed earth model representation comprising a plurality of data indices and a look-up table comprising quantized data values, by quantizing the earth model dataset to generate at least one of the quantized data values;
  - storing the look-up table in the first level memory;
  - storing the indices in the second level memory; and
  - accessing the look-up table from the first level memory and the indices from the second level memory to selectively decompress the compressed earth model representation at the first processor to enable the computation by the first processor.

24. The system according to claim 23, wherein the processor comprises a central processing unit (CPU) and the first level memory comprises a level-one (L1) cache memory.

25. The system according to claim 23, further comprising:
- a second processor in communication with the first processor, the second processor having a first level memory and a second level memory, the second level memory of the second processor being slower but with a higher memory capacity than the first level memory of the first processor; and
- wherein the computer readable media is accessible by one or both of the first and second processors, and wherein the computer readable media further comprises computer readable code for:
  - storing the look-up table in the first level memory of the second processor instead of the first level memory of the first processor;
  - storing the indices in the second level memory of the second processor instead of the second level memory of the first processor; and
  - accessing the look-up table and the indices from the first level and second level memories of the second processor, respectively, to selectively decompress the compressed earth model representation at the second processor instead of the first processor to enable the computation by the second processor instead of the first processor.

26. The system according to claim 25, wherein the second processor comprises a graphics processing unit (GPU) and the first level memory comprises a shared memory.

27. The system according to claim 25, wherein the second processor comprises a field-programmable gate array (FPGA) and the first level memory comprises a Block RAM (BRAM).

28. An article of manufacture comprising a non-transitory computer readable medium having a computer readable code embodied therein, the computer readable code adapted to be executed to implement a method for computation utilizing an earth model representation, the method comprising:
- compressing an earth model dataset at the first processor to generate a compressed earth model representation, the compressed earth model representation comprising a plurality of data indices and a look-up table comprising quantized data values, by quantizing the earth model dataset to generate at least one of the quantized data values;
- storing the look-up table in a first level memory;
- storing the compressed earth model representation in a second level memory, the second level memory being slower but with a higher memory capacity than the first level memory; and
- accessing the look-up table from the first level memory and the indices from the second level memory to selectively decompress the compressed earth model representation at the first processor to enable the computation by the first processor.

29. The article of manufacture according to claim 28, wherein the method further comprises:
- storing the look-up table in a first level memory of a second processor instead of the first level memory of the first processor;
- storing the indices in a second level memory of the second processor instead of the second level memory of the first processor, second level memory of the second processor being slower but with a higher memory capacity than the first level memory of the second processor; and
- accessing the look-up table and the indices from the first level and second level memories of the second processor, respectively, to selectively decompress the compressed earth model representation at the second processor instead of the first processor to enable the computation by the second processor instead of the first processor.

* * * * *